United States Patent [19]

Vansant et al.

[11] Patent Number: 4,620,857

[45] Date of Patent: Nov. 4, 1986

[54] METHOD FOR A CONTROLLED CHANGE OF THE PORE SIZE IN SOLIDS

[75] Inventors: Etienne Vansant, Zoersel; Paul De Bievre, Kasterlee; Guido J. Peeters, Berchem; Anita Thijs, Heusden-Zolder; Ingrid Verhaert, Zichem, all of Belgium

[73] Assignee: European Atomic Energy Community (Euratom), Plateau du Kirchberg, Luxembourg

[21] Appl. No.: 662,223

[22] Filed: Oct. 18, 1984

[30] Foreign Application Priority Data

Oct. 21, 1983 [EP] European Pat. Off. ........ 83201516.8

[51] Int. Cl.$^4$ .............................................. B01D 53/04
[52] U.S. Cl. ...................................... 55/75; 427/226; 428/405; 502/60
[58] Field of Search ...................... 55/66, 75; 206/0.6, 206/0.7; 427/220, 226; 428/405; 502/60, 78

[56] References Cited

U.S. PATENT DOCUMENTS

| | | | |
|---|---|---|---|
| 3,305,656 | 2/1967 | Devins | 55/75 X |
| 3,316,691 | 5/1967 | Sesny et al. | 55/75 X |
| 3,392,508 | 7/1968 | Scholten et al. | 55/75 |
| 3,442,819 | 5/1969 | Herbert | 55/75 X |
| 3,536,521 | 10/1970 | McKinney et al. | 55/75 X |
| 3,658,696 | 4/1972 | Shively et al. | 55/75 X |
| 3,698,157 | 10/1972 | Allen et al. | 55/75 X |
| 3,724,170 | 4/1973 | Allen et al. | 55/75 X |
| 3,962,129 | 6/1976 | Münzner et al. | 55/75 X |
| 4,090,981 | 5/1978 | Rodewald | 55/75 X |
| 4,414,005 | 11/1983 | De Biévre et al. | 55/75 |

FOREIGN PATENT DOCUMENTS 29875 6/1981 European Pat. Off. .
49936 4/1982 European Pat. Off. .

*Primary Examiner*—Robert Spitzer
*Attorney, Agent, or Firm*—Weingarten, Schurgin, Gagnebin & Hayes

[57] ABSTRACT

A porous solid such as a zeolite of clay can be degassed to make it suitable as an adsorbent, after which the entrances of the pores are narrowed to a desired size by treating the porous solid with two chemisorbable materials, one of which is diborane. The treatment may be repeated.

The purpose of the first such treatment is to make the pore entrances so narrow, that unduly large molecules cannot enter and the smaller ones can, while a later treatment may serve to narrow the pores still further, so that the adsorbed molecules cannot escape.

9 Claims, No Drawings

METHOD FOR A CONTROLLED CHANGE OF THE PORE SIZE IN SOLIDS

This invention relates to a method for pore size modification in such a way that specific molecular sieving effects can be obtained by controlled pore size reduction, and that encapsulation of compounds, elements or ions can be performed by pore closure. It is known that porous materials such as zeolites can adsorb gases and other materials, and that they can take in ions by ion exchange, provided that the pores of the substrate are large enough. A purely physical sorption or ion exchange, however, is a equilibrium process depending on concentration, pressure, temperature etc. It is therefore essentially reversible and not suitable for immobilising ions or molecules in a stable manner in a solid matrix.

In U.S. Pat. No. 3,316,691, it is proposed to encapsulate gases or fluids in a suitable zeolite, whose pores are not large enough to take in the molecules concerned. In that process the molecules are forced into the structure at high temperatures (250°–350° C.) and high pressures (2000 bar). After cooling to room temperature, the pressure is released, and the molecules remain trapped in the zeolite.

The European Pat. No. 80103117.0 (Penzhorn) describes a similar method for encapsulating gas molecules in zeolites under high pressures and high temperatures. The encapsulation, however, is based on a thermal vitrification of the zeolite in the presence of a pressurised gas. Under this pressure, and at higher temperature, the zeolite transforms into amorphous stable material, containing the enclosed gas molecules.

The European Pat. No. 81201137.7 describes the possibility to encapsulate gas molecules and other molecules by closing or narrowing the zeolite pores after sorption under normal conditions of temperature and pressure. The pore size reduction is obtained by a structural modification process, based on chemisorption of a modifier such as $SiH_4$, $B_2H_6$, etc. on structural hydroxyl groups, followed by further reaction with $O_2$, $H_2O$, $CH_3OH$, etc.

In the present application we claim very stable effective pore size reductions by using reactions of nitrogen (or phosphorous) compounds such as $NH_3$, $NH_4+$ or their alkyl derivatives or compounds such as pyridine etc. with diborane in aluminosilicates or zeolites (hereafter called the "material"). Some possible examples of such reactions are given below:

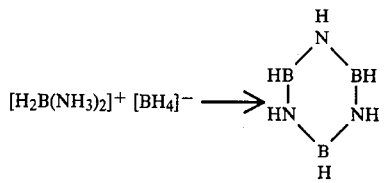

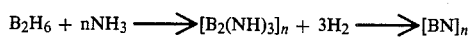

Similar reactions can occur when these compounds react with each other in any zeolite or clay mineral, whatever its structure, chemical composition, or ionic form is. Analogous reactions take place if one of the reaction components is previously chemisorbed on the substrate. Thus, if $B_2H_6$ is previously chemisorbed in a and H zeolite, the reaction of $NH_3$ or other N or P compounds with the boranated samples is carried out, a further pore size reduction is obtained. Another type of procedure consists in reaction of diborane in zeolites which have been subject to chemisorption of $NH_3$ or other N or P compounds. In addition, successive alternating treatments with $NH_3$ and with $B_2H_6$ are possible. Boron-nitrogen compounds, connected to the structural framework of the substrate, are formed, yielding stable obstructions with a strong pore size reducing effect. Of course, these reactions can always be combined in many ways with hydrolysis reactions such as reactions with structural OH groups and/or hydration water.

EXAMPLE I

A mordenite sample was degassed (dehydrated) in a vacuum at 450° C. and 1.95 meq $NH_4+/g$ dry material was then adsorbed. The following treatments were applied: boranation at 20° C., heating at 150° C., boranation at 150° C., heating at 400° C., oxidation with $H_2O$ and dehydration at 400° C. After each step sorption capacities were measured. The results, tabulated below, indicate that a small boranation results in a dramatic exclusion of $N_2$ at −196° C. At 150° C. boranation reactions proceed intensively, and a further strong pore size reduction is observed. After oxidation, adsorption appears to be limited to the external surface and the zeolite pores are closed completely. An argument for NH to be really involved in the reactions is the fact that deammoniation did not occur when the zeolite was heated at 400° C. after boranation.

TABLE 1

| Treatment | Sorption capacities (% of original capacity) as a function of modification treatment. | | |
|---|---|---|---|
| | Kr (0° C.) | $N_2$ (−196° C.) | Ar (−23° C.) |
| degassed at 450° C. | | | |
| 1,95 meq $NH_3$ chemisorbed/g material | 100 | 100 | 100 |
| 0.34 mmol $B_2H_6$/g material at 20° C. | 83 | 6,3 | 99 |
| heated to 150° C. | 87 | 22,5 | 74 |
| 2.23 mmol $B_2H_6$/g material chemisorbed at 150° C. | 3,7 | 0,37 | 9,5 |
| heated to 400° C. | 21 | 1,33 | 42 |
| oxidised with $H_2O$ and degassed at 400° C. | 2 | 0,07 | 3,9 |

EXAMPLE II

A $CH_3NH_3+$-mordenite was reacted with $B_2H_6$ and the exclusion for Kr and $N_2$ was followed:

TABLE 2

| Treatment | Sorption capacities (% of original capacity) as a function of modification treatment | |
|---|---|---|
| | Kr (0° C.) | $N_2$ (−196°) |
| dehydration 450° C. in a vacuum and chemisorption of $CH_3NH_2$ | 100 | 100 |
| chemisorption of 0.47 mmol $B_2H_6$/g material at 20° C. | 13 | 12 |
| heating to 150° C. | 96 | 17 |
| chemisorption of 1.3 mmol $B_2H_6$/g material at 150° C. | 5,6 | 1,7 |
| heating to 400° C. | 2 | 1,4 |
| oxidation with water vapour at | 2 | 1,9 |

TABLE 2-continued

| Sorption capacities (% of original capacity) as a function of modification treatment | | |
|---|---|---|
| Treatment | Kr (0° C.) | $N_2$ (−196°) |
| 100° C. and dehydration at 400° C. | | |

EXAMPLE III

A mordenite sample was prepared in its H-form, dehydrated in a vacuum at 400° C., and reacted with 1.60 mmol $B_2H_6$ per g mordenite at 150° C. Then the boranated sample was reacted with $NH_3$ at room temperature. During this reaction $H_2$ was evolved, indicating a real reaction between the $NH_3$ and the $BH_n$ groups in the zeolite. When heated at 400° C., again $H_2$ was evolved and only a small amount of $NH_3$ was liberated by the zeolite. Deammoniation did not occur and therefore formation of stable B—N bonds in the zeolite is concluded. When treated with water, again a small amount of $H_2$ was evolved. The sorption properties are measured after each step, and tubulated below.

TABLE 3

| Sorption capacities (% of original capacity) as a function of the modification treatment. | | | |
|---|---|---|---|
| Treatment | Kr (0° C.) | $N_2$ (−196° C.) | Ar (−23° C.) |
| degassed at 400° C. | 100 | 100 | 100 |
| boranated at 150° C. | 21 | 0.93 | 64 |
| $NH_3$ sorbed at 20° C. | (1.82) | 0.66 | (0.95) |
| heated at 400° C. | (0.30) | 0.64 | (2.85) |
| oxidised with $H_2O$ and degassed at 400° C. | (2.4) | 0.83 | (3.8) |

We claim:

1. A method for reducing the pore size of a porous solid, comprising the following steps:
    heating said solid to produce a degassed material;
    treating said degassed material with one of reagents x and y, where:
    x is diborane; and
    y is a volatile compound of nitrogen or phosphorous capable of reacting chemically with diborane;
    treating said degassed material with the other of said reagents x and y; and causing reagents x and y to react to form a deposit at the entrances of the pores, resulting in a modified porous solid having pore entrances of a size smaller than the pore entrances of the original porous solid.

2. The method of claim 1, wherein said porous solid is an aluminosilicate.

3. The method of claim 2, wherein said aluminosilicate is a zeolite.

4. The method of claim 3, wherein said zeolite is mordenite.

5. The method of claim 1, wherein reagent y is selected from the group consisting of ammonia, alkyl amines, and pyridine.

6. The method of claim 1, wherein said causing step comprises: heating at a temperature in the range of about room temperature to about 200° 1 C.

7. The method of claim 1 further comprising the steps of treating said modified porous solid alternately with reagents x and y, and causing each of said reagents to react with the existing deposit before further treatment steps are applied.

8. The method of claim 1 further comprising the step of treating said modified porous solid with water or steam to swell said deposit and further close the pores.

9. A method for trapping a material in the pores of a porous solid, comprising:
    providing a modified porous solid produced in accordance with claim 1 and possessing pore sizes which accommodate the material to be trapped but which exclude materials larger than those intended to be trapped;
    bringing said material to be trapped into contact with said modified porous solid, whereby the material to be trapped enters the pores of said modified porous solid; and
    treating said modified porous solid with water or steam to swell the deposit and further close the pores, preventing the material to be trapped from leaving the pores.

* * * * *